Patented Sept. 11, 1951

2,567,873

UNITED STATES PATENT OFFICE 2,567,873

HYDROXYL- AND ALKOXYL-SUBSTITUTED CYCLOALKYLPHENYL ALIPHATIC ACIDS AND THE PRODUCTION THEREOF

Robert R. Burtner, Skokie, Ill., assignor to G. D. Searle & Co., Chicago, Ill., a corporation of Illinois No Drawing. Application June 29, 1949, Serial No. 102,169

12 Claims. (Cl. 260—520)

This invention relates to cycloalkyl phenyl aliphatic acids containing hydroxyl and alkoxyl substituents in the phenyl nucleus, to salts thereof and to methods for producing such compounds. More particularly this invention relates to compounds of the general structural formula

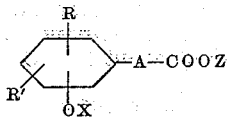

wherein R is a cycloalkyl radical, R' is a hydrogen, lower alkyl, lower alkoxyl or hydroxyl radical, X is hydrogen or a lower alkyl radical, A is a bivalent aliphatic hydrocarbon radical, and Z is hydrogen or one equivalent of a cation.

In the foregoing structural formula, R represents alicyclic radicals such as cyclohexyl, cyclopentyl, cyclobutyl, cycloheptyl, as well as alkyl derivatives of such radicals. X represents hydrogen or lower alkyl radicals such as methyl, ethyl, propyl, isopropyl, butyl, isobutyl, secondary-butyl, tertiary-butyl, and the like. R' represents lower alkyl and lower alkoxyl radicals such as the foregoing, and the hydroxy radical. The bivalent aliphatic hydrocarbon radical represented by A contains 2 to 8 carbon atoms and may be straight or branch-chained. It may be saturated or unsaturated. The preferred radical represented by A is the ethylene radical, although related alkylene radicals such as propylene, butylene, and amylene, and polymethylene radicals are within the scope of this invention. Unsaturated aliphatic hydrocarbon radicals containing 1 or 2 double bonds, such as vinylene and allylene, are likewise within the scope of this invention. Z represents hydrogen or a cation such as an alkali metal ion, an ammonium ion or an amine ion.

It is the object of this invention to provide novel chemical substances of the foregoing type. It is a further object of this invention to provide simple and economical methods of producing such substances. It is still another object to provide feasible synthetic methods for the foregoing substances from readily available starting materials.

The compounds of this invention are produced by reacting a substituted benzaldehyde of the following general formula

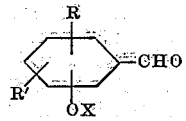

with malonic acid in pyridine in the presence of a basic catalyst such as piperidine or trimethylamine. This condensation can also be carried out in acetic acid containing a small amount of acetic anhydride. The resulting unsaturated acid may be reduced to a saturated acid by catalytic hydrogenation with a noble metal catalyst or with nickel, or by chemical methods.

The compounds which comprise this invention are useful as intermediates in chemical syntheses. They are also useful as therapeutic agents. Certain of them are effective choleretic agents and may be administered in the form of the free acids or in the form of water soluble salts. Others are useful as antibacterial agents.

Salts of the acids which comprise this invention are generally prepared by reacting the acids with an aqueous solution of alkali or of an organic amine such as a lower alkyl, dialkyl, or trialkyl amine or corresponding alkanol amine, filtering the solution so formed and evaporating the filtrate to dryness, generally under low pressure and at low temperature. In certain instances the salts of the acids of this invention may be obtained in crystalline form by salting out said salts with a simple inorganic salt such as sodium chloride, sodium sulfate or ammonium chloride. Alternatively salts of the acids of this invention can be prepared by reacting an alcoholic solution of the acid with an alcoholic solution of an alkali or an amine. The salts are often insoluble in the alcohol and may be isolated as precipitates. In other instances the salts may be thrown down by the addition of a second solvent in which the salt is insoluble. Among such solvents are ether, benzene, chloroform and carbon tetrachloride.

My invention is disclosed in further detail by means of the following examples which are set forth for the purpose of illustrating the invention and which are in no way to be construed as limiting the invention in spirit or in scope. It will be apparent to those skilled in the art that many conventional modifications in solvent, temperature, catalyst, and reagents can be adopted without departure from the intent and purpose of this invention. Relative amounts of materials are given in parts by weight.

Example 1

72 parts of o-cyclohexylanisole and 94 parts of zinc cyanide are suspended in 200 parts of benzene maintained at ice temperature. The mixture is agitated and a stream of hydrogen chloride is passed into the suspension for a period of 1 hour. Then 80.4 parts of anhydrous aluminum chloride are added over a period of 2 minutes, and the mixture is agitated at ice temperature for 10 minutes. The mixture is allowed to warm spontaneously to about 40° C. and agitated at 40–45° C. for about 4 hours. The mixture is quenched with ice and hydrochloric acid. The aldimine-zinc complex is refluxed and agitated with 100 parts of water and 100 parts of hydrochloric acid for 20 minutes. The mixture is chilled and extracted with benzene. The benzene extract is washed with water, dried, and evaporated. The residue of 3-cyclohexyl-4-methoxybenzaldehyde is distilled under reduced pressure at 145–146° C. at 0.3 mm.

A solution of 218 parts of 3-cyclohexyl-4-methoxybenzaldehyde and 208 parts of malonic acid in 400 parts of pyridine containing 10 parts of piperidine is heated to about 100° C. for 4 hours. The mixture is poured into an ice cold solution of 460 parts of concentrated sulfuric acid in 1500 parts of water. The white granular precipitate of 3-cyclohexyl-4-methoxycinnamic acid is collected on a filter, washed and dried. After recrystallization from methanol in the presence of decolorizing charcoal, this acid forms colorless crystals melting at 202–203° C.

Example 2

50 parts of 3-cyclohexyl-4-methoxycinnamic acid are reduced in 2500 parts of glacial acetic acid at 45–50° C. under a hydrogen pressure of 50 p. s. i., using 1 part of platinum oxide catalyst. The reduction is complete in about 20 minutes. The catalyst is removed and the solvent is evaporated yielding a crystalline residue of β-(3-cyclohexyl-4-methoxyphenyl)propionic acid. It melts at 126–127° C. after recrystallization from cyclohexane.

Example 3

10 parts of β-(3-cyclohexyl-4-methoxyphenyl)propionic acid are suspended in 120 parts of hydriodic acid (specific gravity 1.7) and 25 parts of acetic anhydride. The mixture is refluxed for 15 minutes during which time the acid dissolves. The resulting solution is poured into 200 parts of ice water and the precipitate of β-(3-cyclohexyl-4-hydroxyphenyl)propionic acid is separated, washed and dried.

Example 4

3-cyclohexyl-4-methoxybenzoic acid is prepared by oxidizing 3-cyclohexyl-4-methoxybenzaldehyde with a suitable oxidizing agent such as silver oxide, potassium permanganate, chromic acid, nitric acid, bromine, and other oxidizing agents. After recrystallization from methanol, it melts at about 196° C.

A solution of 264 parts of bromine in 800 parts of carbon tetrachloride is added slowly to an agitated solution of 361 parts of 3-cyclohexyl-4-methoxybenzaldehyde and 5 parts of iodine in 3200 parts of carbon tetrachloride at room temperature. The solution is agitated at room temperature for 15 hours and at reflux temperature for 6 hours. The solution is cooled, washed with water, with 10% sodium thiosulfate solution and finally with water. The solvent is removed and the partially crystalline residue is washed with cold petroleum ether and filtered. The crystalline 3-cyclohexyl-4-methoxybenzoic acid is recrystallized from cyclohexane and forms colorless crystals melting at about 196° C.

Example 5

A solution of 33 parts of p-cyclohexylanisole and 43.2 parts of zinc cyanide in 90 parts of benzene is saturated with hydrogen chloride at 0° C. and then treated with 37 parts of anhydrous aluminum chloride. The reaction is carried out as in Example 1. 5-cyclohexyl-2-methoxybenzaldehyde distills at 140–160° C. at 0.6 mm. pressure. It is converted into 5-cyclohexyl-2-methoxycinnamic acid by reaction with 10 parts of malonic acid in 20 parts of pyridine containing 0.5 part of piperidine as in Example 1. The reaction mixture is poured into dilute sulfuric acid and extracted with ether. The ether extract is then extracted with 10% sodium hydroxide solution. The alkaline extract on acidification yields a viscous oily precipitate of 5-cyclohexyl-2-methoxycinnamic acid. This precipitate granulates on standing. It is collected on a filter, triturated with water, and dried. After recrystallization from methanol, it forms white crystals melting at about 146° C.

Example 6

5 parts of 5-cyclohexyl-2-methoxycinnamic acid in 200 parts of glacial acetic acid are hydrogenated at 40–50° C. and under a hydrogen pressure of 40–50 p. s. i. in the presence of 0.1 part of platinum oxide catalyst. When the absorption of hydrogen ceases the solution is filtered and evaporated. The residue of β-(5-cyclohexyl-2-methoxyphenyl)propionic acid is separated, washed with petroleum ether and dried at 60–65° C.

I claim:

1. A compound of the formula

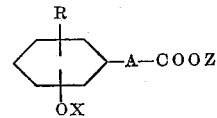

wherein R is a cyclohexyl radical, X is a member of the group consisting of hydrogen and lower alkyl radicals, A is a bivalent aliphatic hydrocarbon radical selected from the group consisting of ethylene and vinylene radicals and Z is a member of the group consisting of hydrogen and one equivalent of a cation.

2. An acid of the formula

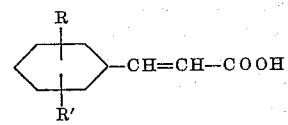

wherein R is a cyclohexyl radical and R' is a lower alkoxyl radical.

3. A compound as in claim 2 wherein R' is a methoxyl radical.

4. 3-cyclohexyl-4-methoxycinnamic acid.

5. 5-cyclohexyl-2-methoxycinnamic acid.
6. An acid of the formula

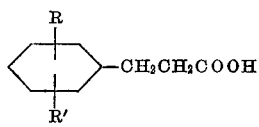

wherein R is a cyclohexyl radical and R' is a lower alkoxyl radical.

7. An acid as in claim 6 wherein R' is a methoxyl radical.

8. β-(3-cyclohexyl-4-methoxyphenyl)propionic acid.

9. The process of producing an acid of the formula

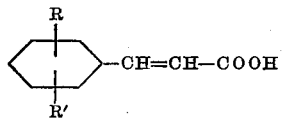

wherein R is a cyclohexyl radical and R' is a lower alkoxyl radical which comprises condensing a cyclohexyl-lower-alkoxy-benzaldehyde with malonic acid in pyridine in the presence of piperidine, acidifying the reaction mixture and separating the substituted cinnamic acid thus formed.

10. The process of producing a cyclohexyl-methoxy-cinnamic acid which comprises condensing a cyclohexyl-methoxy-benzaldehyde with malonic acid in pyridine in the presence of piperidine, acidifying the reaction mxture and separating the substituted acid thus formed.

11. An acid of the formula

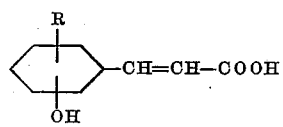

wherein R is a cyclohexyl radical.

12. An acid of the formula

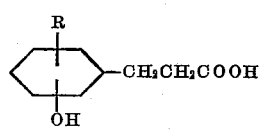

wherein R is a cyclohexyl radical.

ROBERT R. BURTNER.

No references cited.